US007228390B2

United States Patent
Rischar et al.

(10) Patent No.: US 7,228,390 B2
(45) Date of Patent: Jun. 5, 2007

(54) SAFETY CONTROLLER WITH HARDWARE MEMORY LOCK

(75) Inventors: Charles Martin Rischar, Chardon, OH (US); Raymond Louis Buvel, Wauwatosa, WI (US); Joseph Paul Izzo, New Berlin, WI (US); Jeremy Stephen Vechinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 203 days.

(21) Appl. No.: 10/661,885

(22) Filed: Sep. 12, 2003

(65) Prior Publication Data

US 2005/0060508 A1 Mar. 17, 2005

(51) Int. Cl.
  *G06F 12/14* (2006.01)
  *G06F 12/16* (2006.01)
  *G05B 11/00* (2006.01)

(52) U.S. Cl. .............. 711/152; 711/163; 711/164; 700/18; 700/19; 700/20; 700/21

(58) Field of Classification Search ............ None
See application file for complete search history.

(56) References Cited

U.S. PATENT DOCUMENTS

| 5,136,704 A * | 8/1992 | Danielsen et al. ............ 714/11 |
| 5,553,237 A | 9/1996 | Eisenberg et al. |
| 6,026,016 A * | 2/2000 | Gafken ................. 365/185.04 |
| 6,631,476 B1 | 10/2003 | Vandesteeg et al. |
| 2002/0133680 A1* | 9/2002 | Rosenquist et al. ......... 711/163 |
| 2003/0051053 A1 | 3/2003 | Vasko et al. |
| 2003/0051203 A1 | 3/2003 | Vasko et al. |
| 2003/0145120 A1 | 7/2003 | Vasko et al. |
| 2003/0208283 A1* | 11/2003 | Vasko et al. .................. 700/21 |

* cited by examiner

*Primary Examiner*—Hyung Sough
*Assistant Examiner*—Mardochee Chery
(74) *Attorney, Agent, or Firm*—Keith M. Baxter; R. Scott Speroff

(57) ABSTRACT

A safety controller provides for reliable mixed execution of standard and safety control programs held in a common memory by providing a hardware lock that is locked at times when the safety program is not executing to minimize potential corruption of the safety program by the standard program.

26 Claims, 5 Drawing Sheets

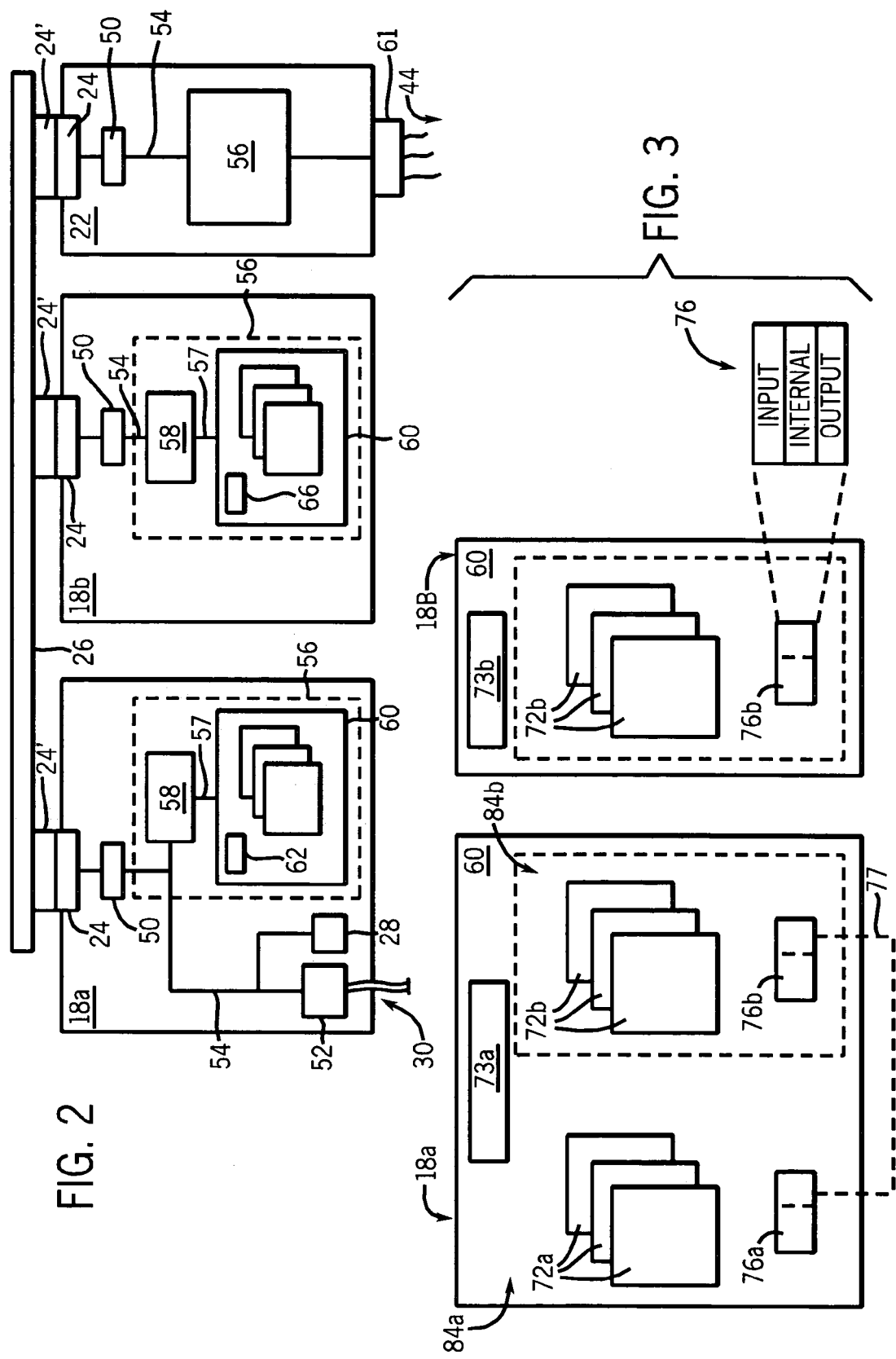

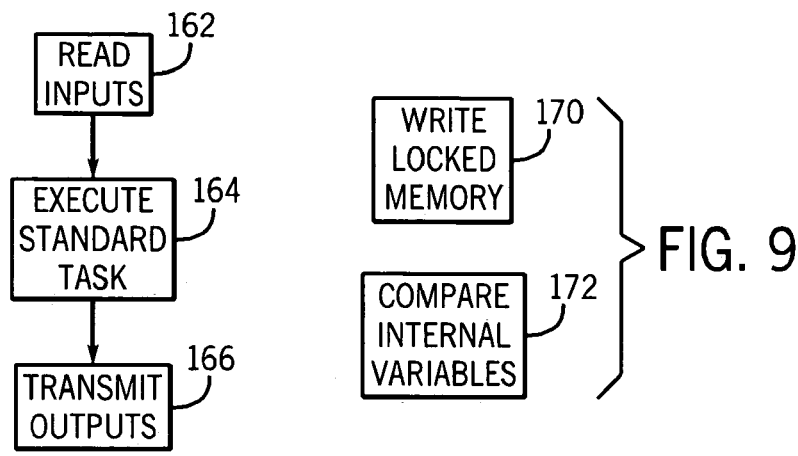
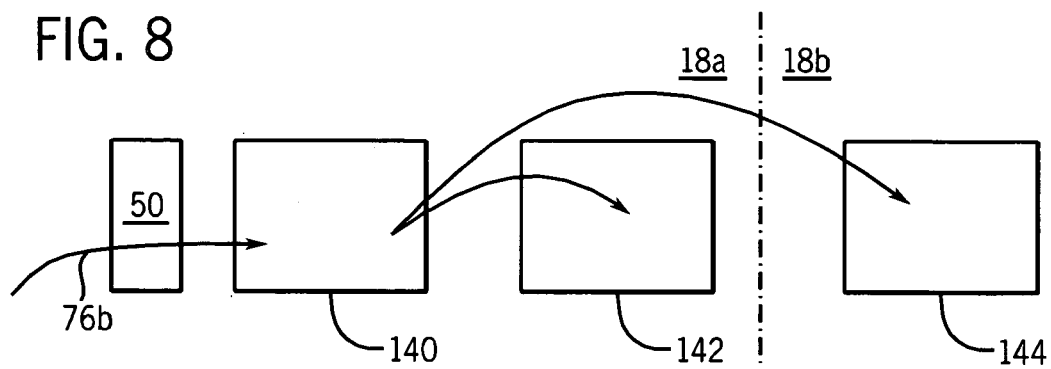
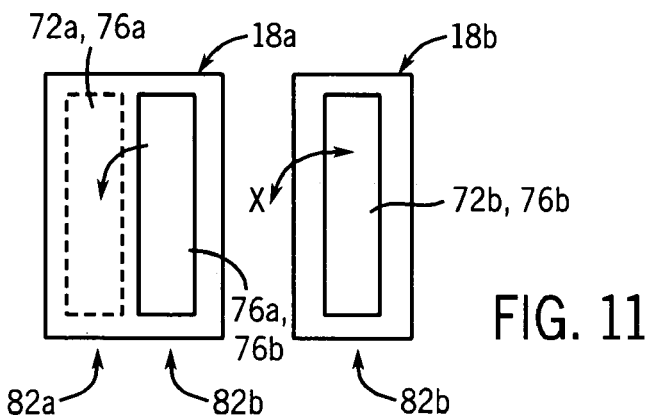
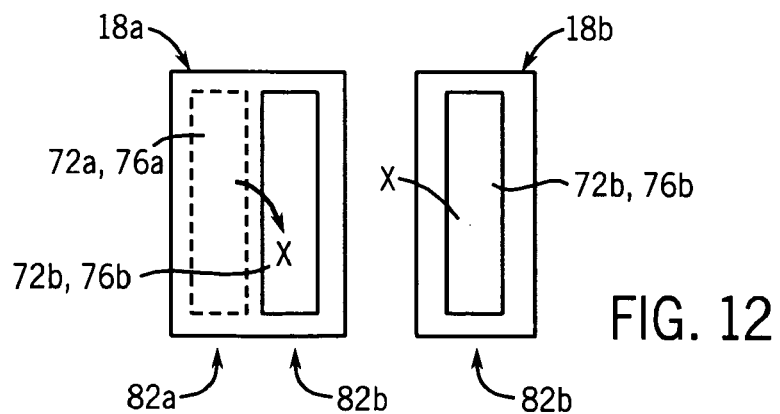

SAFETY CONTROLLER WITH HARDWARE MEMORY LOCK

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers used for real-time control of industrial processes, and in particular to "high reliability" or "safety" industrial controllers appropriate for use in devices intended to protect human life and health.

Industrial controllers are special-purpose computers used in controlling industrial processes. Under the direction of a stored, controlled program, an industrial controller examines a series of inputs reflecting the status of the controlled process and changes a series of outputs controlling the industrial process. The inputs and outputs may be binary, that is, on or off, or analog, providing a value within a substantially continuous range. The inputs may be obtained from sensors attached to the controlled process, and the outputs may be signals to actuators on the controlled process.

"Safety systems" are systems intended to ensure the safety of humans working in the environment of an industrial process. Such systems may include the electronics associated with emergency-stop buttons, light curtains, and other machine lockouts. Traditionally, safety systems have been implemented by a set of redundant circuits separate from the industrial control system used to control the industrial process with which the safety system is associated. Such safety systems have been "hardwired" from switches and relays including specialized "safety relays" which provide comparison of redundant signals and internal checking of fault conditions such as welded or stuck contacts.

Hard-wired safety systems using duplicate wiring have proven cumbersome in practice because of the difficulty of installing and connecting hardwired components and duplicate sets of wiring, particularly in complex control applications, and in part because of the difficulty of troubleshooting and maintaining a hard-wired system whose logic can be changed only by re-wiring.

For this reason, there has been considerable interest in developing industrial controllers that may implement safety systems using a program simulating the operation of the physical components in hard-wired safety systems. Industrial controllers are not only easier to program but may provide reduced installation costs by eliminating long runs of redundant wiring in favor of a high speed serial communication network and by providing improved troubleshooting capabilities. U.S. patent applications Ser. No. 60/373,592 filed Apr. 18, 2002; Ser. No. 10/034,387 filed Dec. 27, 2001; Ser. No. 09/667,145 filed Sep. 21, 2000; Ser. No. 09/666,438 filed Sep. 21, 2000; and Ser. No. 09/663,824 filed Sep. 18, 2000, assigned to the assignee of the present invention, describe the implementation of safety systems using industrial controller architectures, and are hereby incorporated by reference.

High reliability can be obtained in an industrial controller system by employing two industrial controllers which simultaneously execute the same control program and compare their operations to detect faults. Often a safety application will be part of a more complex control process and it would be desirable to run, on common hardware, a safety program together with a standard control program, the latter addressing portions of the process where high reliability is not required.

Such execution of standard programs and safety programs in the same controller raises the possibility that the standard programs may fail in a manner so as to corrupt either the safety program or its data, particularly in a multi-tasking environment in which both safety tasks and standard tasks share the same memory. On the other hand, wholly separate controllers for the safety tasks and the standard tasks significantly increases the cost of the control system and the complexity of its development.

SUMMARY OF THE INVENTION

The present invention permits execution of standard tasks and safety tasks on common hardware, for example in a multi-tasking environment, with reduced risk of corruption of the safety tasks by the standard tasks. A hardware memory lock is provided that prevents writing to memory areas holding safety tasks at times when the safety task is not executing. Before execution of a safety task, either the operating system or the task itself unlocks this memory area and relocks it again, prior to the task exiting. In this way, renegade tasks may be both detected and prevented from corrupting the safety tasks and data.

Specifically then the present invention provides a safety controller having a processing unit with a processor executing instructions, and a memory holding instructions and data, the processing unit providing a hardware lock preventing writing of at least a portion of the memory as controllable by a lock instruction. The memory is adapted to hold a standard program and safety program, the safety program requires higher reliability execution than the standard program. A program executable on the processing unit schedules the safety program and standard program at different times and unlocks a portion of memory holding the safety program at times when the safety program is executing and locks the portion of memory at other times.

Thus, it is one object of the invention to allow a single processing unit to execute both standard and safety programs while reducing the risk of corruption of the safety program by the standard program.

Both the safety program and data used by the safety control program may be in the locked memory. The safety controller may further include I/O circuitry, exchanging input/output values within an external machine, and the data used by the safety program may include input/output values.

Thus, it is another object of the invention to prevent corruption of the safety input/output data by the standard program.

The means for unlocking may be a program such as an operating system scheduling the standard program and the safety program as tasks, and unlocking the memory portion at the start of the safety tasks only and locking the memory portion at the conclusion of the safety task.

Thus, it is another object of the invention to provide for the locking and unlocking without additional programming burden to the user.

The program may confirm the memory portion is locked at the start of a safety task prior to unlocking the memory portion holding the safety task, and invoke an error if the memory portion is not confirmed locked.

Thus, it is another object of the invention to detect errors such as may leave memory portions unlocked or unlock them at the wrong time.

The locked memory may still be read.

Thus, it is another object of the invention to prevent corruption of safety programs and instructions without interfering with the benefit of common memory of either the safety or standard program being able to rapidly to read each other's data.

The memory may allow different portions to be locked and unlocked.

Thus, it is another object of the invention to further minimize possible corruption of the safety program by limiting the unlocking of the memory to only the task currently being executed.

The invention may provide a lock-checking program periodically checking the status of the portion of memory holding a safety program when a safety program is not executing and invoking an error if it is unlocked.

Thus, it is another object of the invention to provide for a check of the locking system that may detect failures of the locking system.

These particular objects and advantages may apply to only some embodiments falling within the claims and thus do not define the scope of the invention.

BRIEF DESCRIPTION OF THE FIGURES

FIG. 2 is an electrical schematic representation of the primary and partner controllers of FIG. 1;

FIG. 3 is logical representation of the primary and secondary controllers of FIG. 2 showing the allocation of safety tasks and standard tasks;

FIG. 8 is a flowchart similar to that at FIG. 7 showing execution of a standard task on the primary and partner controllers;

FIG. 9 is a representation of two regularly scheduled tasks for checking the memory lock and comparing variables between the primary and partner controllers;

FIG. 10 is data flow chart showing the synchronization of input data per one step of FIG. 7 using a two-stage buffer to ensure uniformity of asynchronous input values;

FIG. 11 is a simplified view of FIG. 3 showing the effect of asymmetrical loading of standard and safety program information in preventing corruption of standard program information by the safety program; and FIG. 12 is a figure similar to that of FIG. 11 showing the effect of asymmetrical loading of standard and safety program information in preventing the standard program from undetected modification of safety program information.

DETAILED DESCRIPTION OF THE PREFERRED EMBODIMENT

"High reliability" and "safety" systems are those that guard against the propagation of erroneous data or signals by detecting error or fault conditions and signaling their occurrence and/or entering into a predetermined fault state. High reliability systems may be distinguished from high availability systems which attempt to remain operating after some level of failure. The present invention may be useful in both systems, however, and therefore, as used herein, high reliability and safety should not be considered to exclude high availability systems that provide safety operation.

Figure 1:
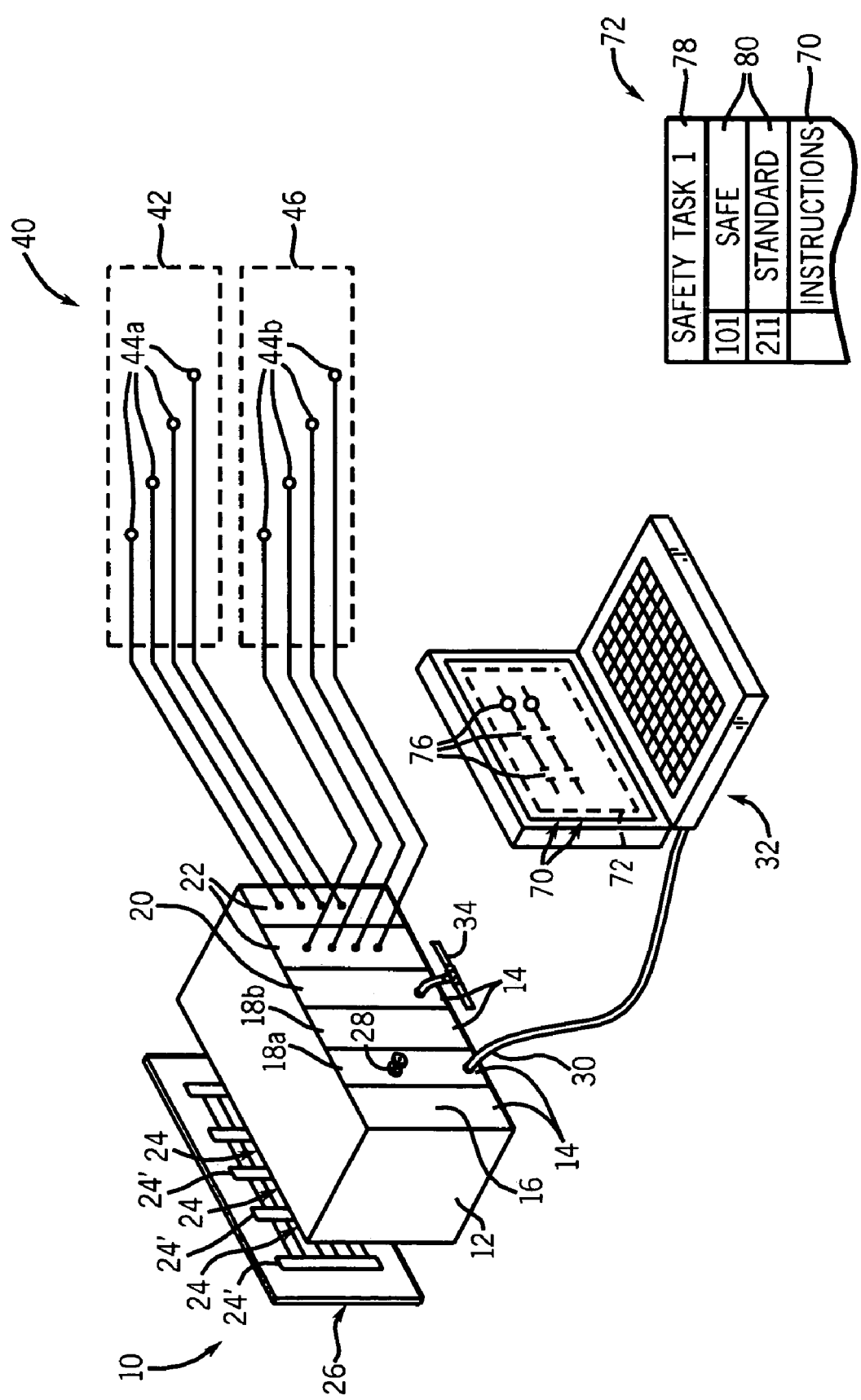
FIG. 1 is a simplified perspective view of a dual controller system suitable for use with the present invention including a primary and partner controller communicating on a backplane and a programming terminal communicating with the primary controller on a dedicated interface.

Referring to FIG. 1, a dual controller safety system 10 suitable for use with the present invention provides a chassis 12 into which a set of control modules 14 may be inserted according to the needs of the particular control application. Each of the modules 14 provides an electrical connector 24 at its rear (not shown) that may connect with a corresponding connector 24' on the front surface of a backplane 26 forming a rear wall of the chassis 12. The connectors 24' are joined by conductive traces so that modules 14 may be freely inserted into the chassis 12 to interconnect on the backplane 26 according to methods well known in the art.

The control modules 14 may generally include a power supply 16, a network module 20 and one or more input/output (I/O) modules 22, a primary controller 18a, and a partner controller 18b.

The power supply 16 may provide a source of regulated power over power conductors of the backplane 26 to the other modules 14 while the network module 20 provides a connection between communication conductors of the backplane 26 and a high speed serial network 34 such as an Ethernet or the like. The network 34 which may communicate with a remote chassis 12' (not shown) and other modules 14 including I/O modules 22 and other controllers 18. Both the backplane 26 and the network 34 (and interfaces thereto) may support a safety protocol such as that described in U.S. patent application Ser. No. 60/373,592 referenced above.

The I/O modules 22 may communicate with various sensors and actuators 44a and 44b on a controlled process 40. The controlled process 40 may include standard processes 42 such as those of controlling factory equipment or the like, and safety processes 46 related to a safety applications where sensors and actuators 44a are those associated with the standard processes 42 and sensors and actuators 44b are associated with the safety processes 46. As will be described, the dual controller safety system 10 allows execution of both safety control and standard control programs sharing some of the same hardware.

The primary controller 18a and partner controller 18b each provide at least one independent processor and memory for executing a control program. Independent does not require that processor and memories be physically separated, however, that is preferred. In the preferred embodiment, the primary controller 18a and the secondary controller 18b are contained in separate housings, each independently attachable to the backplane 26. In this case, primary controller 18a includes a key switch 28 according to conventions known in the art that allows the primary controller 18a to be placed in a "run" or "programming" mode or other states that may be desirably controlled manually. The primary controller 18a also includes a serial communication port 30 such as an RS-232 port that allows it to communicate directly with a programming terminal 32. The programming terminal 32 may include standard programming tools modified for this application as will be described below.

The secondary controller does not include either the key switch 28 or the communications port 30 and may have other cost saving omissions.

Alternatively, the primary controller 18a and partner controller 18b may be placed in one housing provided the independence of the internal processing units to be described is maintained. The primary controller 18a and partner controller 18b may alternatively be in separate racks 12 connected by a high speed serial link.

Referring now to FIG. 2, primary controller 18a may include an interface circuit 50 communicating via connector 24 with the backplane 26 and an interface circuit 52 communicating with the port 30, both connected by an internal bus 54 to a processing unit 56. Either interface circuits 50 or 52 may be used to receive programming information from the programming terminal 32 shown in FIG. 1 and interface circuit 50 may be used to communicate between primary controller 18a and partner controller 18b or any of the other modules for the communication of safety data, safety program information or other signals as will be described.

The internal bus 54 also connects with key switch 28 so that the key switch 28 (as well as each of the interface circuits 50 or 52) may be monitored by the processing unit 56.

The processing unit 56 includes a processor 58 and a memory 60, the processor 58 communicating directly with the memory 60 by means of a memory bus 57 separate from the internal bus 54 with the memory 60. Multiple processors may also be used. Memory may be a combination of volatile and non-volatile memory. In a multiprocessor system, each processor may have dedicated memory as well as shared memory. The memory 60 holds programs for an operating system and for a number of control tasks designated as either safety tasks or standard tasks. The operating system provides for the scheduling of tasks so that each task is executed in its entirety prior to the next task being invoked, however, other conventional operating systems may also be used. The memory 60 also holds I/O data received from and transmitted to the I/O modules 22. In addition, the memory 60 includes a fixed identification number 62 indicating that it is part of a primary controller 18a and suitable for execution of standard and safety tasks and for direct communication with a user and stored in non-volatile memory.

The partner controller 18b is similar to primary controller 18a but has a reduced part count eliminating interface circuit 52 and key switch 28, but providing an interface circuit 50, a processor 58, and a memory 60 all similar to those of primary controller 18a. An important exception is that partner controller 18b holds an identification number 66 in its memory indicating that it is a partner controller 18b incapable of operating alone or executing standard tasks. The memory 60 of the partner controller 18b also holds programs for an operating system and for a number of safety control tasks only. Together the programs held by the memories 60 of primary controller 18a and the partner controller 18b provide a number of system programs including a transfer and synchronization program as will be described below. As will be understood in the art, the division of the following program functions between the primary controller 18a and partner controller 18b or as between tasks and the operating system may be varied provided the described functions are maintained.

A typical I/O module 22 or network module 20 may include a first interface circuit 50 communicating over internal bus 54 with processing unit 56 and second interface circuitry 61 providing for I/O signals or communication signals as have been described.

Referring now to FIGS. 1 and 3, a user may operate the programming terminal 32 to enter a series of program instructions 70 here represented as rungs in a ladder logic program of a type well known in the art. The instructions may be grouped together into a task 72 representing a set of instructions that are logically executed together and which may be scheduled according to the operating system which implements multi-task scheduling methods as are generally understood in the art. Each of the instructions 70 includes variables 76 representing input and output values corresponding generally to the states of sensors and actuators 44a and 44b or internal program values. These variables 76 may have initial values that will be recorded with the task 72. The instructions may include "safety instructions" specific to safety applications that can only be executed within a safety task.

During the generation of the task 72, a programming tool on the programming terminal 32 will prompt the user to identify each of the variables 76 as a safety variable or a standard variable and the task 72 as either a safety task or a standard task. This status will be embedded in a file 73 holding the task 72 as a safety identifier 78 associated with the task and variable scoping identifiers 80 in the variable definitions portion of the file 73. Note that the present invention allows variables 76 within either a safety task 72 or standard task 72 to be designated either as standard variables 76 or a safety variable 76. A compiling program of standard design enforces this variable isolation such that standard tasks 72 may read but not write the safety variables 76 and safety tasks 72 may neither read nor write standard variables 76. Additional hardware and architectural support for this scoping is also provided as will be described below.

Referring now to FIG. 3, primary controller 18a will execute both standard tasks 72a associated with standard processes 42, and also safety tasks 72b associated with safety processes 46 using a single processing unit 56 operating in time division multiplex In this regard, the primary controller 18a will hold both standard data 76a and safety data 76b in the same physical memory 60 accessible by the processor 58 but in different regions 84 of the memory 60, one region 84a reserved for standard data 76a and one region 84b reserved for safety data 76b as will be described. In order to provide for hardware variable scoping, as will be described, certain of the standard variables 76a from region 84a may be also copied into the region 84b allocated for safety variables 76 as indicated by arrow 77.

The partner controller 18b contains only the safety tasks 72b and the safety data 76b in physical memory 60 including those copied values of the standard data 76a as has been described.

Figure 4:
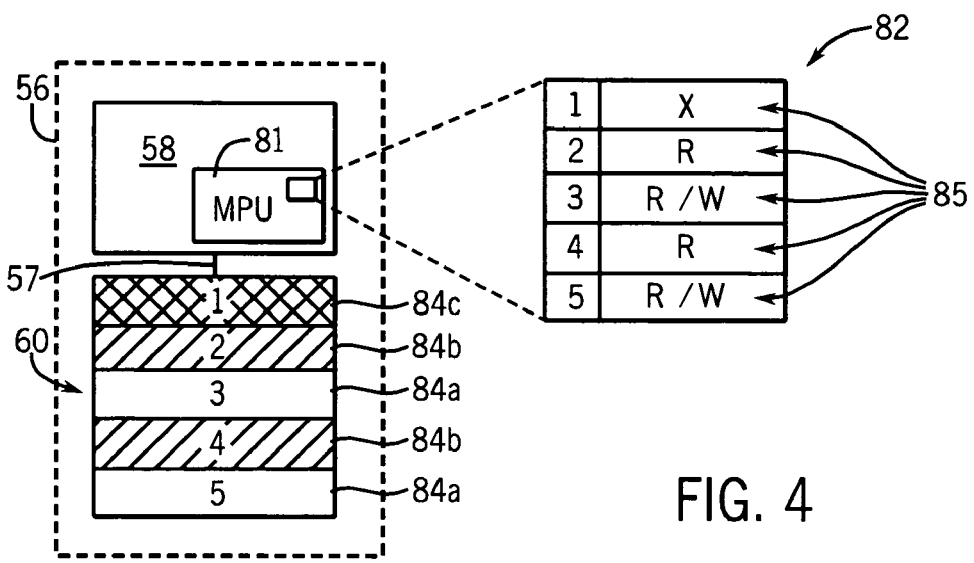
FIG. 4 is a representation of a processing unit suitable for the primary and partner controllers showing a processor with a memory protection unit and connected memory.

Referring now to FIG. 4, the processor 58 of both the primary controller 18a and partner controller 18b incorporates a memory protection unit (MPU) 81 of a type known in the art. The MPU (81) controls access by the processor 58 to memory 60 over the memory bus 57 through the use of hardware incorporated into the circuitry of the processor 58. Generally the MPU 81 employs an internal register 82 listing in entries 95 regions 84 of the memory 60 as may be flexibly defined and designating each region either as a read/write region (R/W) indicating that the region may be read or written to by the processor 58 or a read only region (R) designating that the data of this region may only be read by the processor 58 or unused indicated by an (X) indicating that this memory may be neither written to nor read from. Originally, all memory 60 is marked as a neither read nor write area indicated by (X). Access to the memory is controlled by hardware that physically prevents reading or writing according to the register settings.

Figure 5:
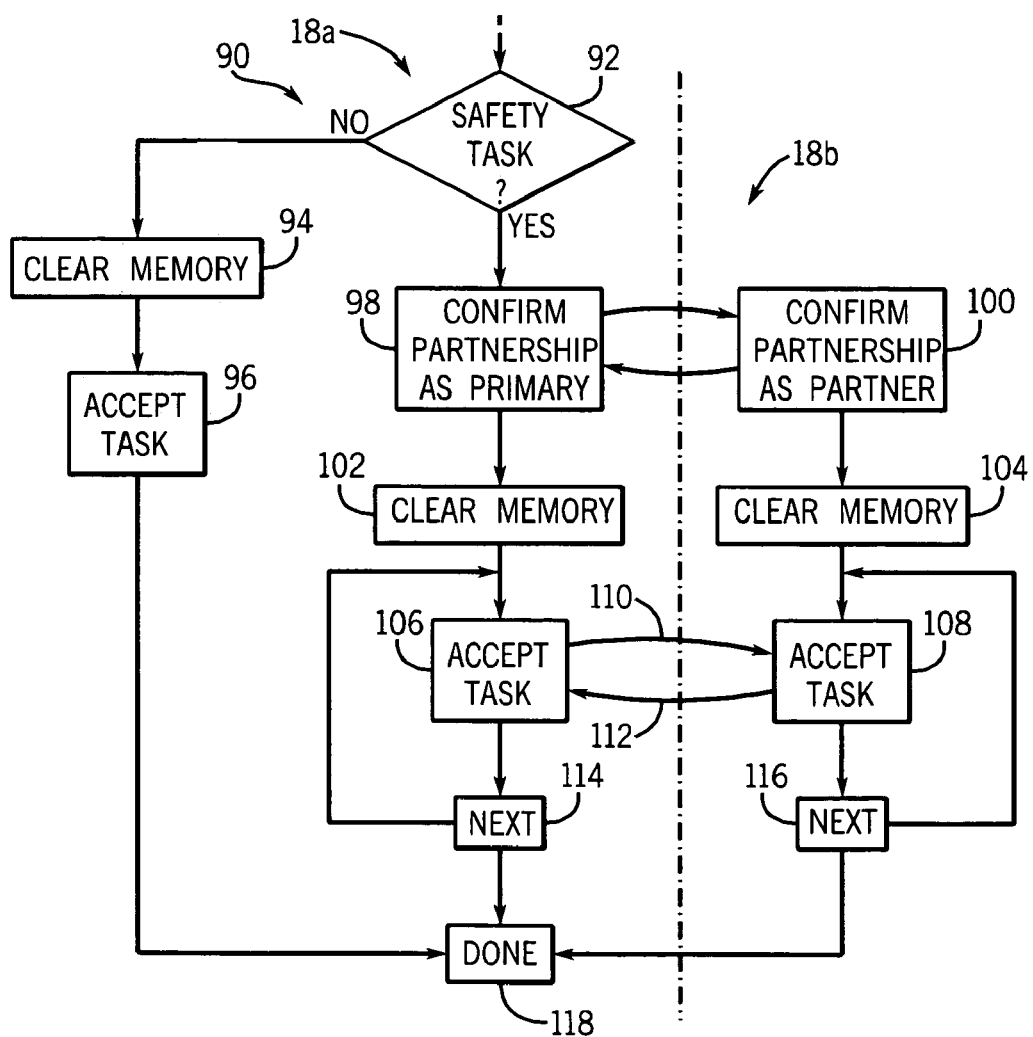
FIG. 5 is a flowchart of a transfer program executed in the primary controller for receiving programming instructions and data.

Referring now to FIG. 5 and FIG. 1, when a control program comprised of a number of tasks 72 is completed, it may be downloaded to the primary controller 18a only of the dual controller safety system 10 from the programming terminal 32 or another source by means of port 30 or network 34. The programming terminal 32 identifies the primary controller 18a by means of the identification number 62 contained in memory 60 of the primary controller 18a and opens a connection with that primary controller 18a. The primary controller 18a must be in the program mode as indicated by key switch 28 or from the programming terminal 32.

Figure 6:
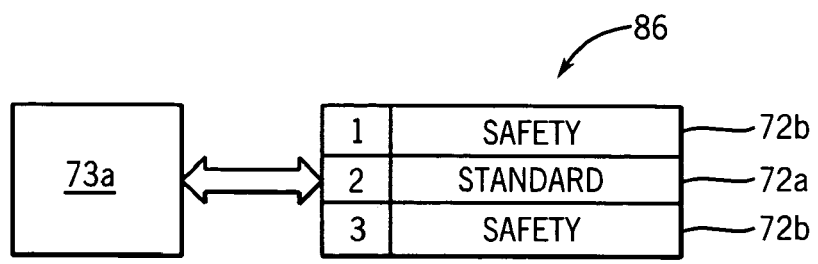
FIG. 6 is a functional diagram of an operating system used by the primary and partner controllers of FIG. 3 such as provides a task list for scheduling tasks for execution, the task list indicating whether the task is a safety or standard task.

Referring also to FIG. 6, at this time each task 72 is loaded into a task queue 86 used by the operating system 73a of the primary controller 18a to schedule each task 72 for execution using scheduling techniques well known in the art of multitasking operating systems. The task queue 86 indicates that the task 72 is a standard task or a safety task. A transfer program 90 in the primary controller 18a identifies each task 72 as a safety task or a standard task at decision block 92 based on the safety identifier 78.

The transfer program 90 in the primary controller 18a then receives each task 72 for downloading. If the task 72 is a standard task, then at process block 94, a region 84a of memory 60 in the primary controller 18a is cleared and at process block 96 the task is loaded into that region 84a. In the present invention, the regions 84a will be initially designated read or write in the register 82 for the MPU 81.

Referring again to FIG. 5, if at decision block 92, the task being received is a safety task, then at process block 98, the primary controller 18a attempts to confirm that there is a partner controller 18b by establishing a link between the primary controller 18a and the partner controller 18b by opening necessary connections on the backplane 26 or on the network 34 (for remote controllers 18) confirming that the partner controller 18b is working and has the necessary operating system 73b and is not otherwise linked to another primary controller 18a. The confirmation process of block 98 works with a corresponding process block 100 in the partner controller 18b.

If partnership is verified, each controller 18a and 18b records this relationship and partner controller 18b enters the safety task 72b in a task queue similar to that of task queue 86. Unlike the task queue 86, however, the task queue of the partner controller 18b will contain only safety tasks and the operating system 73b will schedule safety tasks only in response to the schedule followed by the operating system 73a. Generally, for real time control, each safety task 72b and standard task 72a is scheduled to be repeatedly executed at no less than a predetermined period to provide for suitable response time needed for control applications.

At succeeding process blocks 102 and 104 executed in the primary controller 18a and partner controller 18b, respectively, regions 84b in memory 60 in each of the primary controller 18a and partner controller 18b is cleared for the receipt of the safety task 72b. The regions 84b will be initially designated read only in the register 82 for the MPU 81 of the primary controller 18a and partner controller 18b.

At process block 106 and 108 executed in the primary controller 18a and partner controller 18b, respectively, the safety task 72b is accepted from the programming terminal 32 at the primary controller 18a and forwarded to the partner controller 18b as indicated by arrow 110 to be accepted by the partner controller 18b per process block 108 which replies with an acknowledgment signal 112 indicating that the task 72b has been properly received, being complete and correct. Generally, the safety task 72b is transmitted in portions and these process blocks 106 and 108 are repeated as indicated by the next loop of process block 114 for the primary controller 18a and 116 for the partner controller 18b until all portions are transmitted.

Once the safety task 72b has been fully received at the primary controller 18a and transmitted without error to the partner controller 18b, the transfer program is done as indicated by process block 118 and awaits possible loading of an additional task. Any errors in these blocks results in an error condition being reported to the user and the safety program being prevented from executing.

As a result of the transfer process, the tasks loaded into the primary controller 18a and secondary controller 18b are identical, and therefore if the user needs to upload the tasks, this may be accomplished with communication solely with the primary controller 18a as is done with a conventional controller. A similar procedure is used for program portions describing incremental on line editing of the tasks, that is, the user communicates with the primary controller 18a and the editing information is passed along to the secondary controller 18b by the primary controller 18a.

Figure 7:
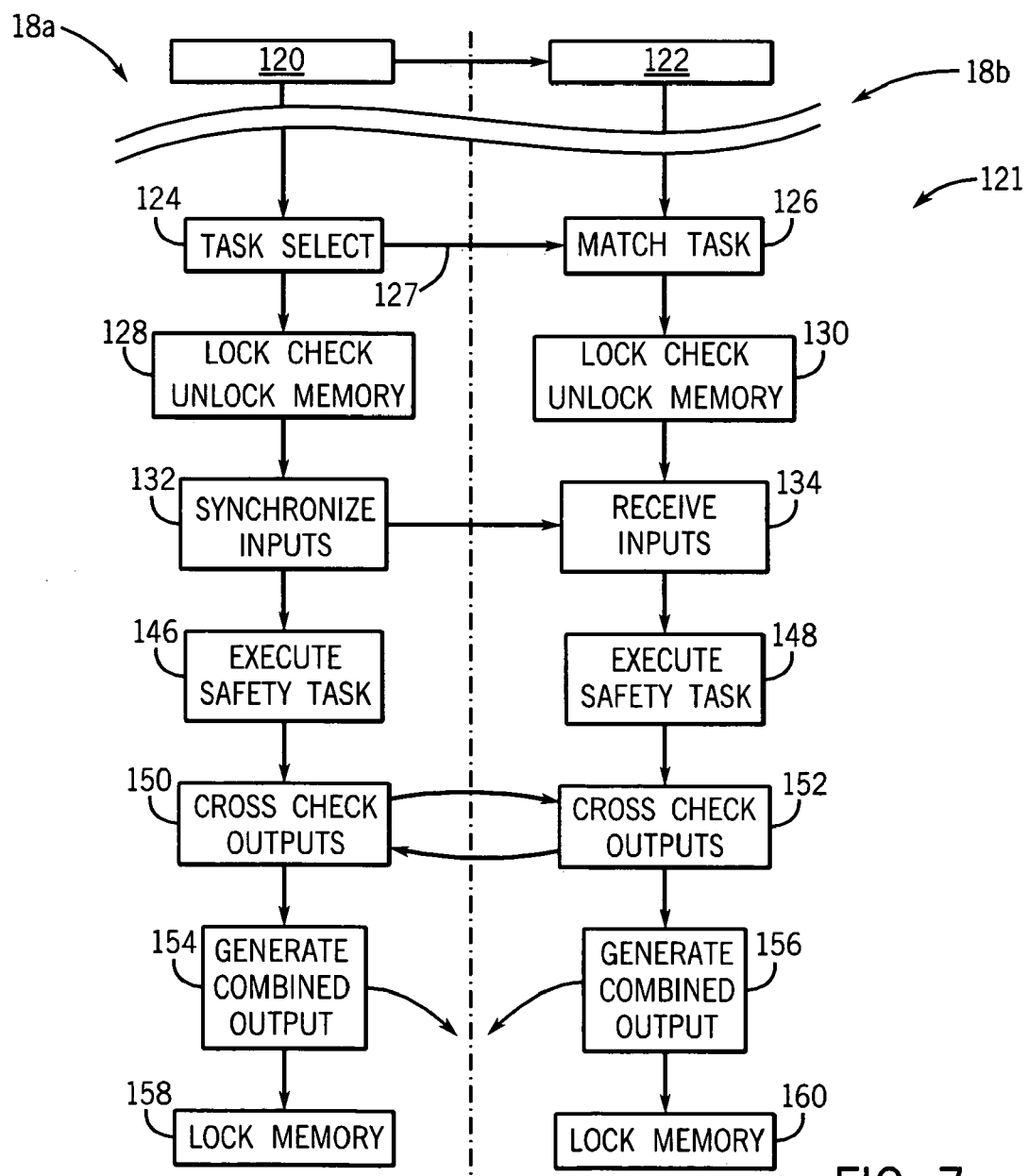
FIG. 7 is a flow chart showing execution of the safety task on the primary and partner controllers.

Referring now to FIG. 7, upon completion of the loading of the necessary standard tasks 72a and safety tasks 72b, the dual controller safety system 10 may be placed in a "run" mode, for example, through the use of key switch 28 shown in FIG. 1 which communicates this state to the partner controller 18b by a message over the backplane 26 whose transmission is indicated by process block 120 executed in primary controller 18a and whose reception is indicated by process block 122 executed in partner controller 18b.

At a first process block 124, executed by the operating system 73a of the primary controller 18a, the primary controller 18a schedules either a safety task 72b or standard task 72a for execution. Generally the operating system of 73b of partner controller 18b follows the scheduling by primary controller 18a and needs to provide fewer functions than the operating system 73a.

Assuming a safety task 72b is selected per task select block 124, the operating system 73a begins a synchronization program 121 starting with the forwarding of a message 127 to the operating system 73b of partner controller 18b indicating that a safety task 72b is about to be executed so that the operating system 73b can find that task 72b in its task queue 86 as indicated by process block 126.

The operating system 73a and 73b then proceed to succeeding process blocks 128 and 130, respectively, where the registers 82 of the MPUs 81 for the memory region 84b holding the tasks 72b and its variables 76 are checked to ensure that these regions 84b are correctly in read only mode. If the regions 84b of the memories 60 are not in the read only mode, this indicates a problem with the previous locking of the memory upon conclusion of a safety task and an error is generated and further execution is suspended until the user corrects the problem.

If the lock check of process blocks 128 and 130 indicates that the regions 84b were locked (e.g., in read only status), then the regions 84b are unlocked (e.g., moved to read/write status) and operating systems 73a and 73b proceed to process blocks 132 and 134, respectively. This unlocking step could alternatively be performed by the safety task itself as a first step so long as task execution is not interrupted by the operating system.

At these process blocks, the inputs for the safety tasks 72b representing input values of the safety variables 76 are synchronized for each of the primary controllers 18a and partner controller 18b.

Referring momentarily to FIG. 10, generally input values 76b are received solely by primary controller 18a asynchronously through interface circuit 50 to be held in asynchronous buffer 140 formed as part of memory 60. This buffer 140 may fill up in an ordered manner according to a scan conducted asynchronously with task scheduling by the operating system 73a or may fill up on a random basis according to changes in input variables 76 that trigger a communication of messages to the primary controller 18a. In the present invention, it is necessary that the input variables 76 exist as identical copies in the memories 60 of the primary controller 18a and partner controller 18b. This synchronization is accomplished by an ordered read out of buffer 140 simultaneously into clean buffers 142 and 144 in primary controllers 18a and partner controller 18b, respectively, during process blocks 132 and 134. In this process, all input data flows from the primary controller 18a to the partner controller 18b so as to eliminate any possibility that different input variables 76 would be in the controllers 18a and 18b as might occur if input variables 76 were communicated directly to each of the primary controller 18a and partner controller 18b separately.

This same procedure allows "forcing" of inputs to be synchronized between the primary controller 18a and the secondary controller 18b. The primary controller 18a places the forced inputs into the buffer 140 with a tag to prevent them from being overwritten, and the forced input is naturally conveyed to the secondary controller 18b.

Referring again to FIG. 7, upon completion of the synchronization of inputs, as indicated by process blocks 146 and 148, the operating systems 73a and 73b execute the safety tasks 72b independently in the primary controller 18a and partner controller 18b, respectively, without further synchronization. This provides for extremely rapid execution of the safety tasks 72a without undue communication delays.

At succeeding process blocks 150 and 152, in the primary controller 18a and partner controller 18b, respectively, primary controller 18a sends its output variables to partner controller 18b and partner controller 18b sends its output variables to primary controller 18a in a cross-checking process. Each of the primary controller 18a and partner controller 18b then compares its own output values to those computed by the other controller. If there is an error, a safety state is entered, otherwise each primary controller 18a and partner controller 18b proceeds to respective process blocks 154 and 156 where they generate a combined output value set for transmission over the network 134 or backplane 26 according to a high reliability protocol. The safety state, as is understood in the art, invokes a set of predefined output values and ceases operation of the control process notifying the operator of an error.

In the present invention, a series of combined data words are generated containing a convenient block of output values computed by primary controller 18a and a complement of the same output values computed by partner controller 18b.

After completion of the generation of the output word described by process blocks 154 and 156, the safety task 72b is complete and the operating system locks the region 84b of memory 60 back to read only mode as indicated by process blocks 158 and 160 and proceeds to the next task as scheduled. Alternatively, the locking could be performed by the finals step of the safety task itself, so long as task execution is not interrupted by the operating system.

Referring to FIGS. 6 and 8, if at process block 124 of FIG. 7, the task select block selects a standard task 72a, then the operating system 73a simply begins execution of that task on primary controller 18a by reading of the input variables 76 as indicated by process block 162. Execution of the standard task indicated by process block 164 and transmission of output values as indicated by process block 166. Each of these steps is well understood in the art. The partner controller 18b does not execute the standard task but waits for another safety task. The transmission of outputs needs not observe the safety protocol as described.

Referring now to FIG. 9, the operating system 73a and 73b of primary controller 18a and partner controller 18b may periodically execute two additional standard tasks, for example, once every few hours. The first task indicated by process block 170 is a standard task that attempts to write data from each safety task identified by task queue 86. If the write fails, for example, by generating an exception, the task completes successfully. Otherwise, if the write is successful, a safety state may be invoked or an error reported to the user because memory lock was not in place.

The second task 172 provides a comparison at periodic intervals of the internal safety variables 76b that form neither inputs nor outputs of the standard processes 42 and 46, between primary controller 18a and partner controller 18b to check that they are in fact identical, even if the output variables may not show any deviation between the execution of the safety tasks 72a. The variables to be compared are buffered while execution of other tasks is stopped.

Referring now to FIG. 11, software scoping of variables between safety task 72b and standard tasks 72a is augmented by the architecture of the present invention. If, for example, safety tasks 72b in primary controller 18a and partner controller 18b, attempt to read or write from memory regions 82a associated with standard tasks 72a and standard variables 76a, the safety task 72b in partner controller 18b will be unable to access the address which will not exist in the partner controller 18b. This failure will either result in an exception, if an erroneous value is read, or will result in a discrepancy between the values retrieved by the tasks 72b producing an error in their ultimate outputs. If standard task information were in both of the primary controller 18a and partner controller 18b, such a failure would operate symmetrically and might not be detected.

Referring to FIG. 12, conversely, if a standard task 72a attempts to write from memory regions 82b holding safety task 72b or safety variables 76b, it will be blocked by the MPU or if it does successfully write, it will write only to region 82b associated with primary controller 18a and not to region 82b associated with partner controller 18b. Again, this asymmetrical writing will result in a change in one of the programs 72b only that will result in a difference in the output variables compared at block 150 and 152 of FIG. 7.

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation, and maintenance of the components of the safety system, and the cooperation and training of individuals using the safety system. Although the present invention is intended to be highly reliable, all physical systems are susceptible to failure and provision must be made for such failure.

It is specifically intended that the present invention not be limited to the embodiments and illustrations contained herein, but include modified forms of those embodiments including portions of the embodiments and combinations of elements of different embodiments as come within the scope of the following claims.

We claim:

1. A safety controller comprising:
   a processing unit having a processor executing instructions, and a memory holding instructions and data, the processing unit providing a hardware lock preventing writing of at least a portion of the memory as controllable by a lock instruction, wherein the memory is adapted to hold an independently executing standard program providing control for an industrial process and a safety program and providing control of safety equipment providing human safety in an environment of the industrial process, the safety program requiring higher reliability execution than the standard program; and
   a lock management program executable on the processing unit determining when the safety program is to be run and based upon this determination, unlocking a portion of memory holding the safety program at times when the safety program is to run and locking the portion of memory at other times when the safety program is finished running and the standard program is to be run so that the standard program when running cannot corrupt the safety program.

2. The safety controller of claim 1 wherein the portion of memory also holds data operated on by the safety program.

3. The safety controller of claim 2 further including I/O circuitry exchanging input/output values with an external machine and wherein the data includes input/output values.

4. The safety controller of claim 1 wherein the lock management program executable on the processing unit is different from the safety program.

5. The safety controller of claim 4 wherein the lock management program executable on the processing unit is an operating system running on the processing unit and scheduling the execution of the safety program and standard program.

6. The safety controller of claim 1 wherein the lock management program executable on the processing unit confirms the memory portion is locked at the start of the safety program before unlocking the memory portion and invokes an error if the memory portion is not locked at the start of the safety program before unlocking the memory portion.

7. The safety controller of claim 1 wherein lock instruction is a setting of a register that may be read by the lock management program indicating the status of different memory portions as locked and unlocked.

8. The safety controller of claim 1 wherein the hardware lock operates so that the locked portion of memory may be read.

9. The safety controller of claim 1 wherein the hardware lock operates so that different portions of memory may be simultaneously locked and unlocked.

10. The safety controller of claim 1 wherein the lock management program executes to keep the portion of memory holding the standard program unlocked.

11. The safety controller of claim 1 wherein the lock management program is a portion of the safety program unlocking the memory portion at the start of safety program and locking the memory portion at the conclusion of the safety program.

12. The safety controller of claim 1 wherein the portion of memory holding the safety program also holds a copy of selected data generated by the standard program.

13. The safety controller of claim 1 further including a lock check program periodically checking the status of the portion of memory holding the safety program when a safety program is not executing and invoking an error is—if the memory portion holding the safety program is unlocked.

14. The safety controller of claim 1 further including:
   a second processing unit having a processor executing instructions, and a memory adapted to hold a copy of the safety program; and
   a synchronization program executable by the processing units to execute the safety program on both processing units and compare execution of the safety programs and to enter a safety state when this execution differs.

15. The safety controller of claim 14 wherein the second processing unit provides a hardware lock preventing writing of at least a portion of the memory adapted to hold a copy of the safety program as controllable by a lock instruction.

16. A method of operating a safety controller having a processing unit with a processor executing instructions, and a memory holding instructions and data, the processing unit providing a hardware lock preventing writing of at least a portion of the memory as controllable by a lock instruction, the method comprising the steps of:
   (a) loading a first portion of memory with a standard program providing control for an industrial process and a second portion of memory with a safety program providing control of safety equipment and providing human safety in an environment of the industrial process, the safety program requiring higher reliability execution than the standard program;
   (b) executing the safety program and standard program at different times and determining when the safety program is to be run and based upon this determination, unlocking the second portion of memory at times when the safety program is to run and locking the second portion of memory at other times when the safety program is finished running and the standard program is to be run so that the standard program when running cannot corrupt the safety program.

17. The method of claim 16 wherein the second portion of memory also holds data operated on by the safety program.

18. The method of claim 17 further wherein the safety controller includes I/O circuitry exchanging input/output values with an external machine and wherein the data includes input/output values.

19. The method of claim 16 further including the step of confirming the second portion of memory is locked at the start of the safety program before unlocking the second portion of memory and invoking an error if the second portion of the memory portion is not locked before the unlocking.

20. The method of claim 16 wherein the lock instruction is a setting of a register that may be read by a program indicating the status of different memory portions as locked and unlocked.

21. The method of claim 16 wherein locked memory may be read but not written to.

22. The method of claim 16 wherein different portions of memory are simultaneously locked and unlocked.

23. The method of claim 16 wherein the first portion of memory remains unlocked.

24. The method of claim 16 further including the step of periodically checking the status of the second portion of memory when a safety control program is not executing and invoking an error if the memory portion is unlocked.

25. The method of claim 16 further wherein the safety controller includes a second processing unit having a processor executing instructions, and a memory adapted to hold a copy of the safety program, and including the step of: executing the safety program on both processing units and comparing execution of the safety programs to enter a safety state when this execution differs.

26. A method of operating a safety controller system comprising the steps of:
  (a) accepting program instructions from a user describing the logical combination of input sensor data to produce output control data;
  (b) collecting the program instructions into logical tasks;
  (c) identifying the task as to one of two levels of reliability, a first level being of higher reliability than the second level;
  (d) loading a task of the first level into a first portion of memory and a task of the second level into a second portion of memory;
  (e) executing the loaded tasks at different times and determining when the task of the first level is to be run and based upon this determination, unlocking the first portion of memory at times when the task of the first level is executing to run and locking the second portion of memory at other times when the task of the first level is finished running and the task of the second level is to be run so that the task of the second level when running cannot corrupt the task of the first level.

* * * * *